(12) United States Patent
Tsai et al.

(10) Patent No.: US 7,105,752 B2
(45) Date of Patent: Sep. 12, 2006

(54) METHOD AND APPARATUS FOR AVOIDING PRESSING INACCURACIES ON A TOUCH PANEL

(75) Inventors: Jung-Yuan Tsai, Tao-Yuan (TW); Wan-Ting Tsai, Tao-Yuan (TW); Wei-Tun Lan, Tao-Yuan (TW)

(73) Assignee: High Tech Computer Corp., Tao-Yuan (TW)

( * ) Notice: Subject to any disclaimer, the term of this patent is extended or adjusted under 35 U.S.C. 154(b) by 408 days.

(21) Appl. No.: 10/462,650

(22) Filed: Jun. 17, 2003

(65) Prior Publication Data
US 2004/0140958 A1 Jul. 22, 2004

(30) Foreign Application Priority Data
Jan. 20, 2003 (TW) .............................. 92101072 A

(51) Int. Cl.
*G09G 5/00* (2006.01)
(52) U.S. Cl. .................... 178/18.01; 345/178; 345/180
(58) Field of Classification Search ............ 345/178, 345/180; 178/18.01
See application file for complete search history.

(56) References Cited
U.S. PATENT DOCUMENTS

| | | | |
|---|---|---|---|
| 5,999,279 A * | 12/1999 | Kouzaki et al. ............ 358/520 |
| 6,043,810 A | 3/2000 | Kim et al. |
| 6,215,477 B1 * | 4/2001 | Morrison et al. ........... 345/173 |
| 6,370,067 B1 * | 4/2002 | Ko et al. ..................... 365/194 |
| 2004/0251402 A1 * | 12/2004 | Reime ......................... 250/221 |

* cited by examiner

*Primary Examiner*—Bipin Shalwala
*Assistant Examiner*—Leonid Shapiro
(74) *Attorney, Agent, or Firm*—Winston Hsu

(57) ABSTRACT

A method and apparatus for avoiding pressing inaccuracies on a touch panel. The touch panel includes a panel, a control module having an analog-to-digital converter (ADC) and a delay buffer, and a processor, the delay buffer able to buffer a trigger signal for interrupting the processor. The method includes sequentially receiving a plurality of analog signals generated by the panel when the panel is touched with the control module, transforming the plurality of analog signals into a plurality of corresponding digital signals and transmitting the plurality of digital signals to the processor with the analog-to-digital converter, neglecting a first m digital signals of the plurality of digital signals, and neglecting a last n digital signals of the plurality of digital signals, where m and n are integers with values equal to or larger than 1.

17 Claims, 8 Drawing Sheets

METHOD AND APPARATUS FOR AVOIDING PRESSING INACCURACIES ON A TOUCH PANEL

BACKGROUND OF INVENTION

1. Field of the Invention

The present invention relates to a computer touch panel input device, and more specifically, to a method and apparatus for avoiding pressing inaccuracies in the touch panel.

2. Description of the Prior Art

A touch pad is a tool for data communication applied in different portable electrical products like a personal data assistance (PDA), a mobile phone, or a notebook. A touch pad integrating input and output functions on a single panel combined with functions of a keyboard, a mouse, and hand-writing can increase efficiency of operations.

Several different technologies are applied in a recently developing touch pad industry, wherein a resistive type touch pad is the commonest one in the market. On a resistive panel of a touch pad, layouts are distributed on an ITO glass and an ITO film according to X and Y dimensions, a dot spacer is arranged in between an upper and a bottom transparent electrode wherein when the upper transparent electrode is pressed by a finger, a pen, or other similar object, the bottom electrodes can make contact indirectly with the upper electrodes. Additionally, different voltage drops differentiated by resistors are used to generate corresponding parameters for calculating positions being pressed on the panel in X-Y dimensions. Please refer to FIG. 1. Illustrated in FIG. 1 is a block diagram of a conventional touch pad 10. The touch pad 10 comprises a panel 12, a control module 14, and a processor 16. The control module 14 is electrically connected to the panel 12, and comprises an analog-to-digital converter (ADC) 20 and a touch apparatus 22. The processor 16 controls operations of the touch pad 10. Additionally, the touch pad 10 comprises an operating system 18. When the panel 12 is pressed, the control module 14 can detect voltage variations on the panel 12 and use the touch apparatus 22 for generating a trigger signal IRQ to alert the processor 16 to read data. Then, the processor 16 will output commands to the control module 14 for reading voltage values on X and Y dimensions respectively, wherein the control module 14 will connect a point X+ to a voltage VCC, connect a point X− to a ground for generating a voltage drop with value of VCC between a resistor RX1 and RX2. Thus, a voltage drop on the X dimension can be detected at a point Y+. Similarly, at a point X+, a voltage drop on the Y dimension can be detected too. Neglecting any leaking current at the points X+ and Y+, the voltage drops can be represented as:

$$\{X \text{ dimension: } Vx = VCC \times RX2/(RX1 + RX2)$$
$$Y \text{ dimension: } Vy = VCC \times RY2/(RY1 + RY2)$$

The analog voltage signals of voltage values on the X and Y dimensions generated from the panel 12 will be transformed to corresponding digital signals by the analog-to-digital converter 20 to the processor 12 at which positions being pressed on the panel 12 can be determined. Thus, the touch pad 10 can determine positions and tracks of a finger or a pen by detecting voltage variations. Please refer to FIG. 2. Illustrated in FIG. 2 is a flowchart of operations of the touch pad 10. After being pressed, the panel 12 will generate a trigger signal IRQ to alert the processor 16. Getting signals regarding to positions, the processor 16 will report to the operating system 18. If the panel 12 is being pressed continuously, the processor 16 will report associated signals to the operating system 18 successively. Thus, two points will be linked as a line, and several points will be linked as a graph until the finger or the pen is removed from the surface of the panel 12.

Many technologies relating to touch pads are disclosed. In U.S. Pat. No. 5,898,426, "Touch panel input device", Kim and et al. disclose a touch pad structure similar to the touch pad 10 illustrated in FIG. 1 with an advantage of being easy to operate. In U.S. Pat. No. 5,670,755, "Information input apparatus having functions of both touch panel and digitizer, and driving method thereof", Kwon and et al. also disclose a similar touch pad further including a stylus pen and a converter to achieve advantages of increasing pressing stability and making the touch pad operate like a digitizer. In U.S. Pat. No. 6,088,024, "Touch panel and method for detecting a pressed position on a touch panel", Yamagata and et al. disclose a touch pad, divided into a display region with functions of a conventional touch pad and a non-display region with functions of a keyboard applied with a switch circuit for a user to make commands or perform hand-writing on the touch pad. However, the structure and arrangement of the touch pad disclosed in the U.S. Pat. No. 6,088,024 is still similar to the other conventional resistive touch pads. Additionally, in U.S. Pat. No. 6,259,597, "Portable electronic device", Anzai and et al. disclose a portable device combined with a fingertip tablet function, a digitizer function by a pen, and a conventional keyboard. Such multiple function combination is truly the development point of the industry.

Basic arrangement and structure is very similar in the above-mentioned touch pads. However, there are still some obstacles to overcome in a resistive touch pad, such as transparent rates, sustainability, and pressing inaccuracies. The problem of pressing inaccuracies is the most vital concern to a user. During operations of a touch pad, at any moment when a touch pad is pressed with a pen, a finger, or similar object, or such pressing objects are removed from the touch pad, contact resistance will be increased because of insufficient pressing pressure, which will influence results detected at observing points. Please refer to FIG. 1 again. As the leaking current on observing point Y+ is small and a value of a series resistance RY1 is also small, voltage drops can be neglected and the voltage value detected on the X dimension will remain Vx. However, if the contact resistance is increased, voltage drops will have greater effect such that the voltage value detected on the X dimension will be less than Vx. Similarly, the voltage value detected on the Y dimension will be less than Vy. The situation will result in unexpected error dots on screen of the touch pad. During successive writing operations, it is highly possible to have imperfect contacts because of instable pressing pressures. Thus, the trigger signal IRQ generated by the control module 14 will not stay at a low potential so that the system will erroneously determine that the pen, the finger, or similar objects has been removed from the panel so as to have a line-breaking problem.

Furthermore, the panel 12 of the touch pad 10 comprises an ITO glass layer and an ITO film layer fixed in place by a seal around the edges of the panel 12. Please refer to FIG. 3. Illustrated in FIG. 3 is a cross sectional diagram of the panel 12 illustrated in FIG. 1. According to basic principles of physics, as the seal layer is applied to fix the panel 12, the touching strength used to stabilize the trigger signal IRQ at a margin domain is larger than that at a central domain. Therefore, it is easier to have error dots or line-breaking problems near the edges of the panel 12. For example, it takes only 80 g at the central domain to stabilize generations of the trigger signal IRQ, but it takes about 150 g at the margin domain to stabilize the trigger signal IRQ. Therefore, at the margin domain of the panel 12, line-breaking problems tend to frequently occur and pressing inaccuracies are more than at the central domain of the panel 12.

Most of the technologies developed recently are focusing on structural aspects of a touch pad. Take a resistive touch pad for example; a touch pad having five wires with advantages in durability and a touch pad having six wires with advantages of avoiding radiation and noise have been developed in recent years. However, there is still no easy solution for the pressing inaccuracies problem in the industry. A conventional resistive touch pad structure and arrangement complemented with some modifications to software processing and hardware design could alleviate the pressing inaccuracies problem, which would be very helpful to the industry.

SUMMARY OF INVENTION

It is therefore a primary objective of the claimed invention to provide a method for avoiding pressing inaccuracies of a touch pad to overcome the problems of the prior art.

According to the claimed invention, a delay buffer for avoiding signals interruptions and unpredictable spikes during rapid writing processing is disclosed. During data processing the claimed invention includes neglecting a first m and a last n data wherein m and n are integers with value equal to or larger than 1, and utilizing different error tolerating standards at pressing and writing regions to determine correctness of the data to solve the problem of writing quality at the margin domain and totally avoid pressing inaccuracies of a touch pad.

One objective of the claimed invention is to provide a method for avoiding pressing inaccuracies in a touch pad wherein the touch pad comprises a panel for generating a plurality of analog voltage signals; a control module comprising an analog-to-digital converter for transforming the plurality of analog signals to a plurality of corresponding digital signals, the control module electrically connected to the panel for monitoring the panel and receiving a plurality of analog voltage signals; and a processor electrically connected to the control module for receiving and processing the plurality of digital signals to control operations of the touch pad. The method comprises:

(a) sequentially receiving the plurality of analog signals generated by the panel when the panel is touched with the control module;

(b) transforming the plurality of analog voltage signals to a plurality of corresponding digital signals and transmitting the plurality of digital signals to the processor with the analog-to-digital converter;

(c) neglecting a first m digital signals of the plurality of digital signals wherein m is an integer with value equal to or larger than 1 with the processor; and (d) neglecting a last n digital signals of the plurality of digital signals wherein n is an integer with value equal to or larger than 1 with the processor.

Another objective of the claimed invention is to provide a method for avoiding pressing inaccuracies in a touch pad, wherein the touch pad comprises a panel comprising at least a margin domain and a central domain for generating a plurality of analog voltage signals; a control module electrically connected to the panel for monitoring the panel and receiving the plurality of analog voltage signals, wherein the control module comprises an analog-to-digital converter (ADC) for transforming the plurality of the analog voltage signals to a plurality of corresponding digital signals, a touch apparatus for generating a trigger signal, and a delay buffer electrically connected to the touch apparatus for buffering the trigger signal; a processor electrically connected to the control module for controlling operations of the touch pad, and an operating system for processing the plurality of the digital signals. The method comprises:

(a) determining whether the panel is being touched with the control module;

(b) outputting the trigger signal with the touch apparatus to the processor to initiate the processor when the control module determines the panel has been touched;

(c) in step (b), buffering the trigger signal with the delay buffer;

(d) after step (a), sequentially generating the plurality of analog voltage signals with the panel;

(e) after step (d), sequentially receiving the plurality of analog voltage signals with the control module, the analog-to-digital converter for transforming the plurality of analog voltage signals to the plurality of corresponding digital signals, and the control module for transmitting the plurality of digital signals to the processor;

(f) neglecting a first m digital signals of the plurality of digital signals with the processor, wherein m is an integer with a value equal to or larger than 1;

(g) after step (f), determining whether the plurality of digital signals are generated in the margin domain or the central domain of the panel with the processor;

(h) after step (g), when the plurality of digital signals are generated in the central domain of the panel, calculating a difference of values of any two signals of the plurality digital signals and determining whether the difference is less than a central error tolerating value with the processor;

(i) after step (g), when the plurality of digital signals are generated in the margin domain of the panel, calculating a difference of values of any two signals of the plurality digital signals and determining whether the difference is less than a margin error tolerating value with the processor;

(j) sequentially generating the plurality of digital signals to the operating system with the processor when a difference is less than the central or margin tolerating value; and (k) in step (j), neglecting a last n digital signals of the plurality of digital signals with the processor, wherein n is a integer with value equal to or larger than 1.

Another objective of the claimed invention is to provide a touch pad comprising a panel for generating a plurality of analog voltage signals, and a control module electrically connected to the panel for receiving the plurality of analog voltage signals, wherein the control module comprises an analog-to-digital converter for transforming the plurality of analog voltage signals to a plurality of corresponding digital signals, a touch apparatus for generating a trigger signal, and a delay buffer electrically connected to the touch apparatus for buffering the trigger signal. The touch pad further comprises a processor electrically connected to the control module for controlling operations of the touch pad, and an operating system for processing the plurality of digital signals wherein when the control module determines that the panel is being touched. The panel will sequentially generate the plurality of analog voltage signals, the touch panel will output the trigger signal to the processor for initiating the processor, and before the processor receives the trigger signal, the delay buffer is capable of buffering the trigger signal for avoiding pressing inaccuracies of the touch pad. At the same time, the control module will sequentially receive the plurality of analog voltage signals, utilize the analog-to-digital converter to transform the plurality of analog voltage signals to the plurality of corresponding digital signals, and output the plurality of digital signals to the processor for sequentially outputting the plurality of digital signals to the operating system.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 4:
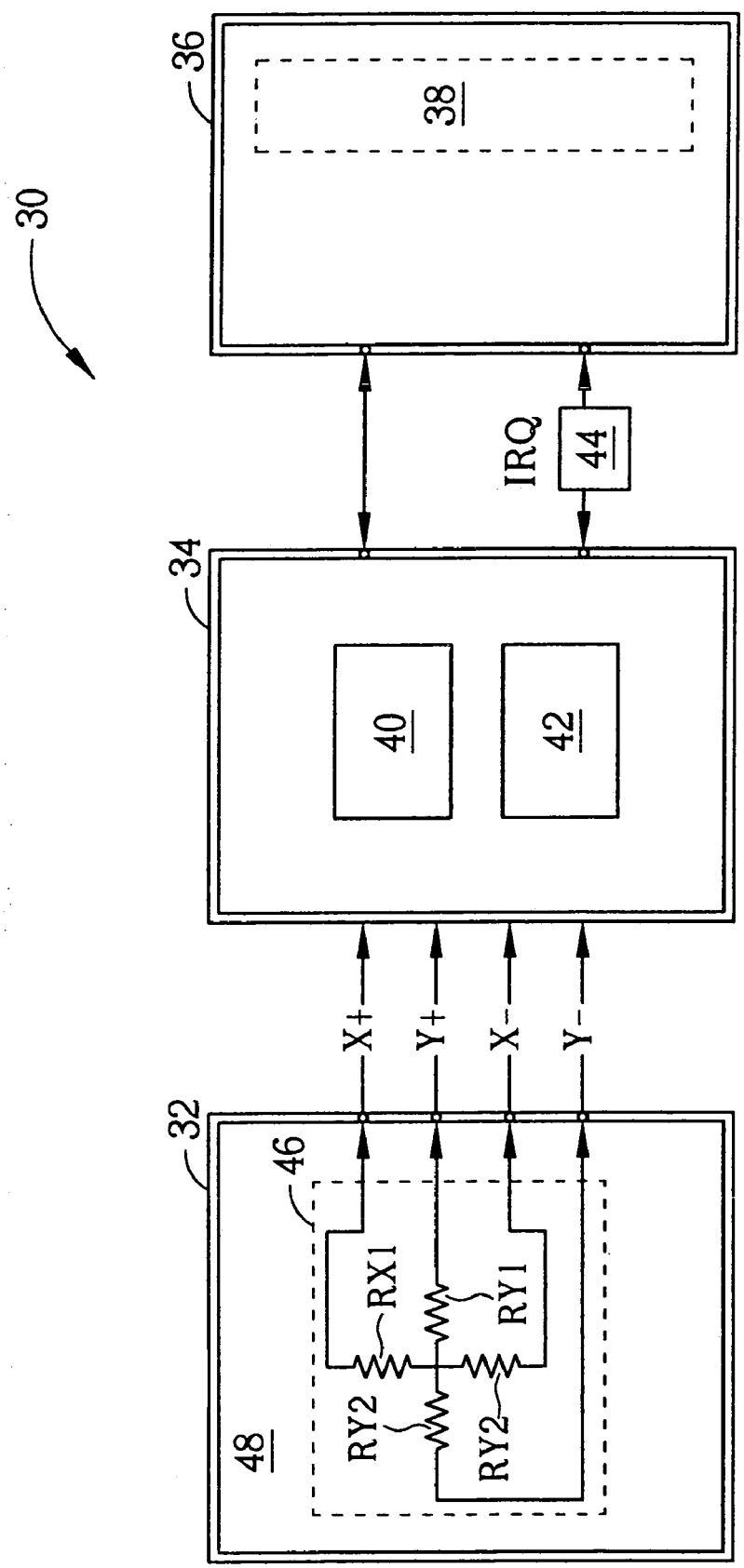
FIG. 4 is a block diagram of a present invention touch pad.

In the present invention, a delay buffer is provided to avoid signal interruptions and unpredictable spikes during rapid handwriting processes. Please refer to FIG. 4. Illustrated in FIG. 4 is a block diagram of an embodiment of a present invention touch pad 30. The touch pad 30 comprises a panel 32, a control module 34, and a processor 36. The panel 32 is utilized to generate a plurality of analog voltage signals when pressed. The control module 34 electrically connected to the panel 32 is utilized to monitor the panel 32 and to receive the plurality of analog voltage signals. The control module 34 further comprises an analog-to-digital converter 40 for transforming the plurality of analog voltage signals to a plurality of corresponding digital signals, and a touch apparatus 42 for generating a trigger signal IRQ. The processor 36 having an operating system 38 therein is utilized to process the plurality of the digital signals. The touch pad 30 further comprises a delay buffer 44 electrically connected between the touch apparatus 42 and the processor 36 for buffering the trigger signal IRQ generated by the touch apparatus 42.

Figure 1:
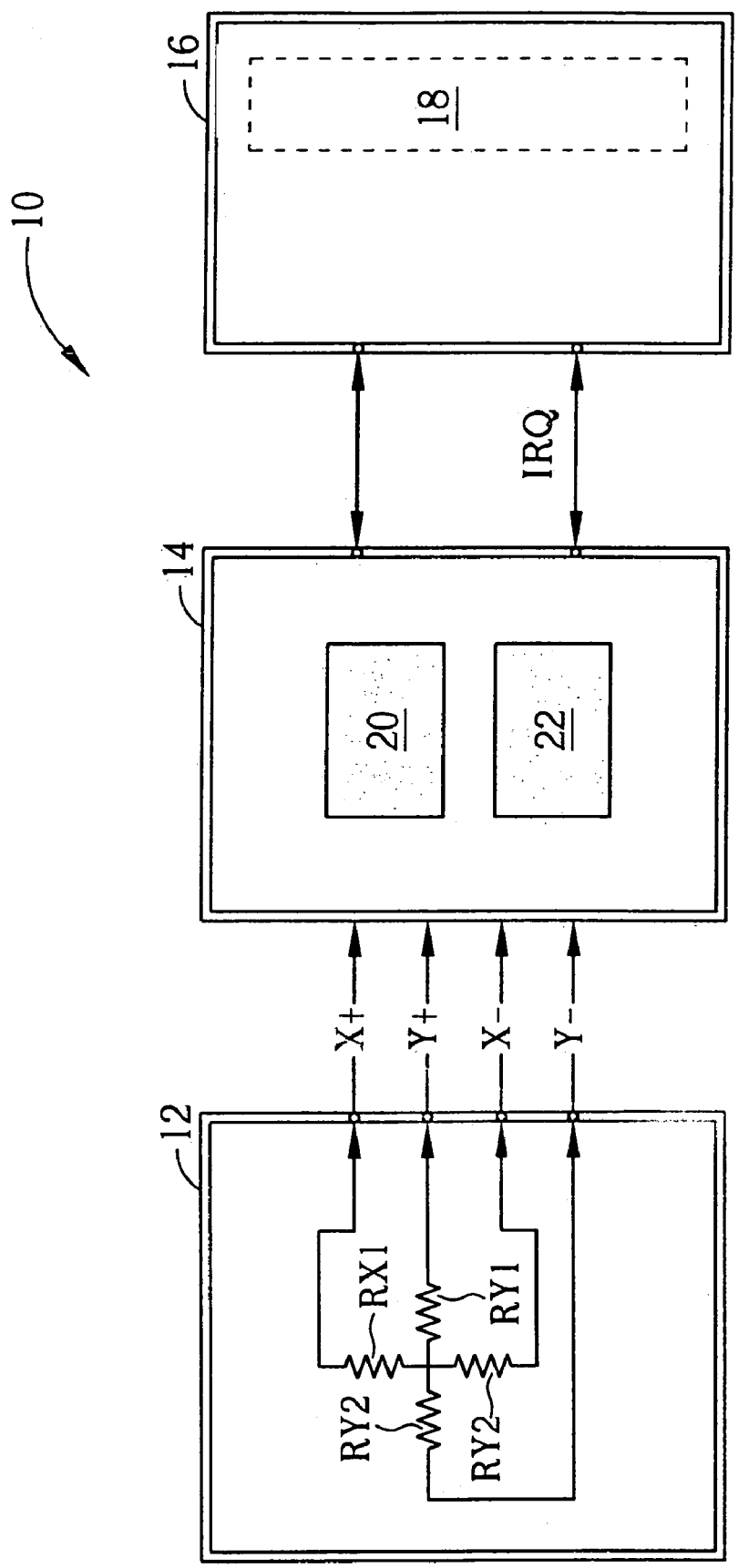
FIG. 1 is a block diagram of a conventional touch pad.
Figure 2:
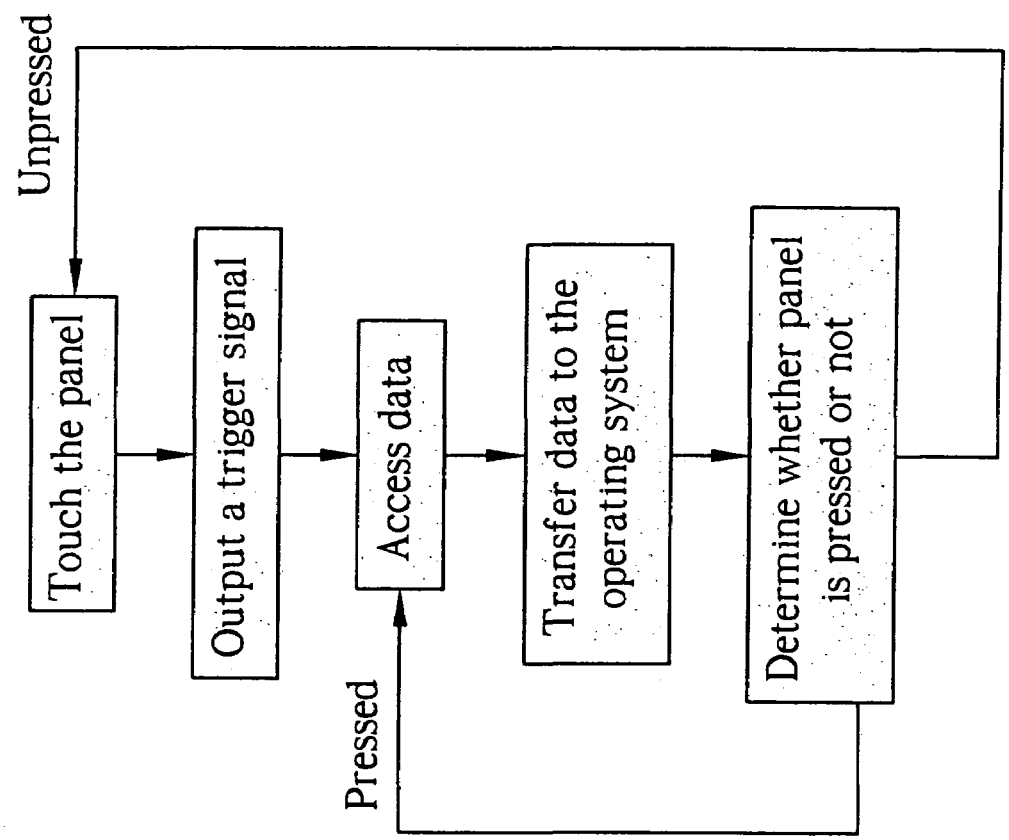
FIG. 2 is a flowchart of operations of the touch pad illustrated in FIG. 2.
Figure 3:
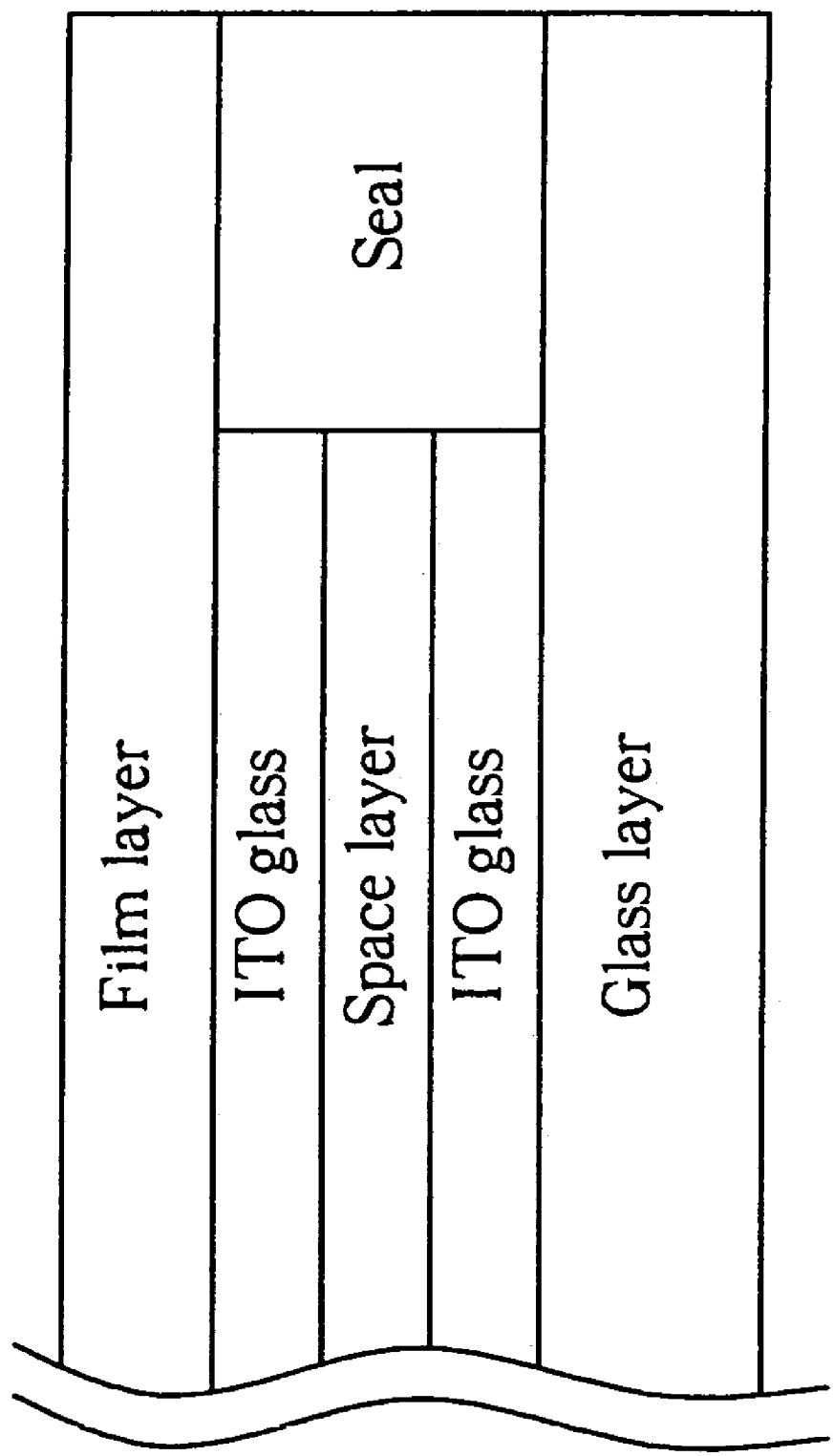
FIG. 3 is a cross-sectional diagram of the panel illustrated in FIG. 1.

The touch pad 30 operates similar to the conventional touch pad 10 illustrated in FIG. 1. When the control module 34 determines that the panel 32 is pressed by a pen, a finger, or other similar object, the panel 32 will sequentially generate a plurality of analog voltage signals. Voltage drops between resistances RX1, RX2, RY1, and RY2 are utilized for detecting voltage values of the X and Y dimensions respectively at observing points X+ and Y+, wherein the analog voltage signals are analog voltage values on X and Y dimensions outputted from the panel 32. When the control module 34 determines that the panel 32 is being pressed, the control module 34 will utilize the analog-to-digital converter 40 to transform the plurality of analog voltage signals to a plurality of corresponding digital signals and output the plurality of digital signals sequentially to the processor 36. Finally, the processor 36 will output the plurality of digital signals sequentially to the operating system 38. Please note that the significant difference between a prior art and the present invention is the delay buffer 44, which is installed between the touch apparatus 42 and the processor 36 for buffering the trigger signal IRQ before the processor 36 receives the trigger signal IRQ.

Figure 5:
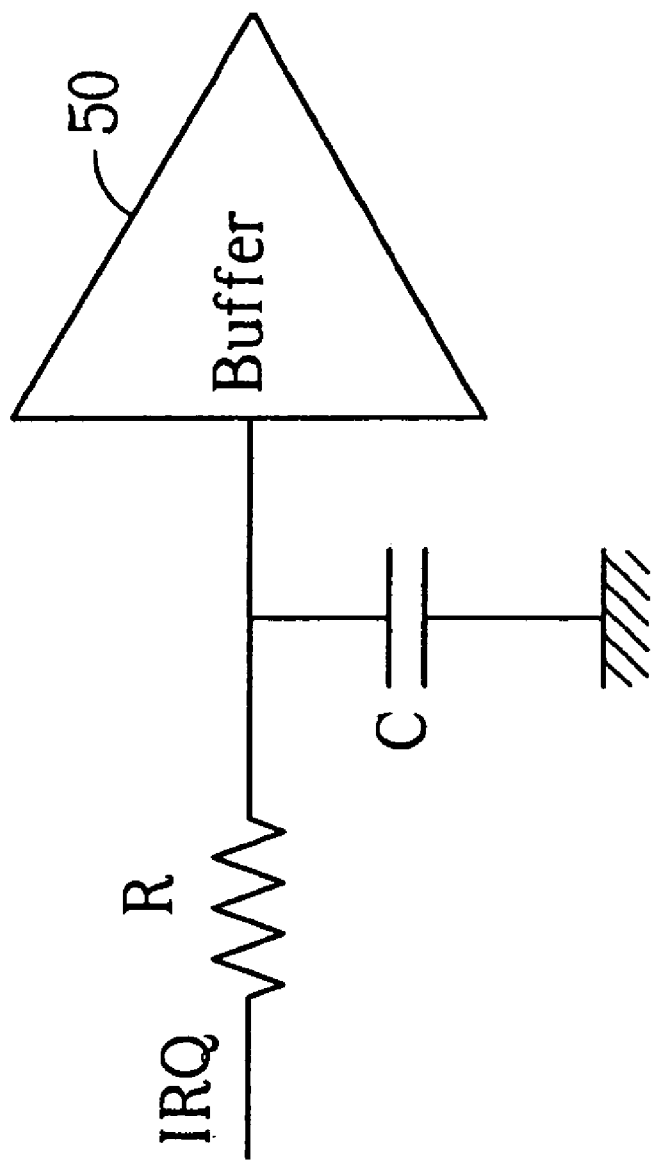
FIG. 5 is a circuit diagram of the delay buffer illustrated in FIG. 4.

Please refer to FIG. 5. Illustrated in FIG. 5 is a schematic diagram of the delay buffer 44 according to an embodiment of the present invention. In the delay buffer 44 illustrated in FIG. 5, a resistance, a capacitance, and a buffer 50 are utilized to generate an R-C delay and increase a time of transition of the trigger signal IRQ from high potential to low potential, or from low potential to high potential. In the prior art, during a handwriting process, imperfect contact resulting from different pressing pressures will generate a quick transition so that a writing line will be interrupted. In the present invention, the delay buffer 44 can increase a time span of transition of the trigger signal IRQ so that if the imperfect contact condition resulted from different pressing pressures lasting just a very small time wherein the trigger signals IRQ resumes its original potential before the processor 36 detects a transition of the trigger signal IRQ, the processor 36 will not determine that a pen or other touching object has been removed from the panel but will continue to perform and process data. Thus, line breaking will be limited. In practice, if the delay buffer 44 utilizes the analog structure illustrated in FIG. 5 to generate a delay, parameters of the resistance and capacitance can be modified according to properties of the panel 32. If a required pressing pressure of the panel 32 is higher, the R-C delay must be larger, if the required pressing pressure of the panel 32 is lower, the R-C delay must be smaller. Certainly, the delay buffer 44 can be a digital delay buffer as well.

Figure 6:
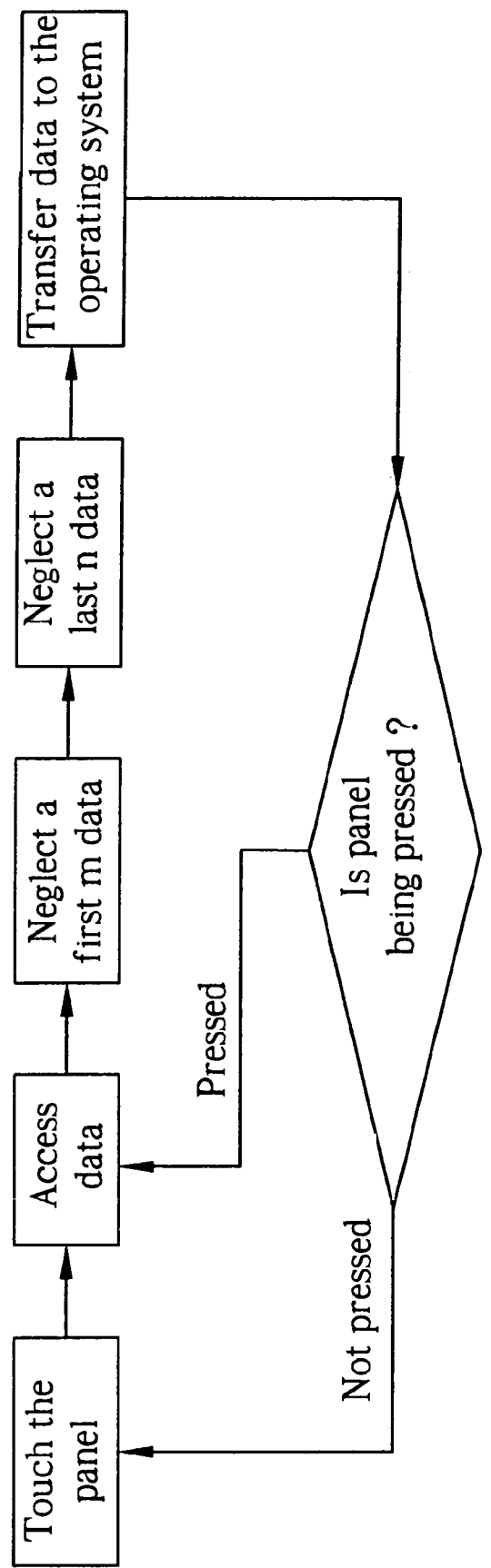
FIG. 6 is a flowchart of operations according to a first embodiment of the present invention touch pad illustrated in FIG. 4.

In order to avoid pressing inaccuracies, several other technologies are further applied in the present invention. Please refer to FIG. 6. Illustrated in FIG. 6 is a flowchart according to a first embodiment of the touch pad 30. First of all, the control module 34 is utilized to determine whether the panel 32 is being pressed. If the control module 34 determines that the panel 32 has not been pressed yet, the control module 34 will continue to monitor the panel 32; if the control module 34 determines that the panel 32 has been pressed, the touch apparatus 42 will generate and output a trigger signal IRQ, or transmit the trigger signal IRQ to the processor 36 to initiate the processor 36. As mentioned above, before the processor 36 is initiated by the trigger signal IRQ, the delay buffer 44 can buffer the trigger signal IRQ. When the panel 32 is pressed, the panel 32 will sequentially generate a plurality of analog voltage signals and the control module 34 will receive the plurality of analog voltage signals wherein the analog-to-digital converter 40 therein will transform the plurality of analog voltage signals to a plurality of corresponding digital signals and output the plurality of digital signals to the processor 36. Then, the processor 36 will neglect a first m digital signals of the plurality of digital signals, wherein m is an integer with a value equal to or larger than 1. Additionally, before the processor 36 sequentially outputs the plurality of digital signals to the operating system 38, the processor will also neglect a last n digital signals of the plurality of digital signals, wherein n is an integer with a value equal to or larger than 1. Please note that the method the processor 36 uses to neglect a last n digital signals of the plurality of digital signals is to output a first n digital signals of the plurality of digital signals being processed to the operating system 38 sequentially so that the signal generated when a pen is removed quickly and temporarily from the panel 32 will not be transmitted to the operating system 38. Thus, the plurality of digital signals outputted to the operating system 38 will not include the last n digital signals before a pen is removed quickly and temporarily from the panel 32. That is, the plurality of digital signals outputted to the operating system 38 will not include a first m and a last n digital signals corresponding to the plurality of analog voltage signals of all the plurality of analog voltage signals. The reason to operate in this way is that, in practice, the moment a pen or a finger is removed from or pressed on the panel 32, the contact resistance will be increased because of inadequate pressures so as to influence detected results at observing points. Therefore, in the present invention, the first m signals after pressing and the last n signals before removing the pen will be neglected. Please note that in practice, values of m and n depend on specific designs.

Figure 7:
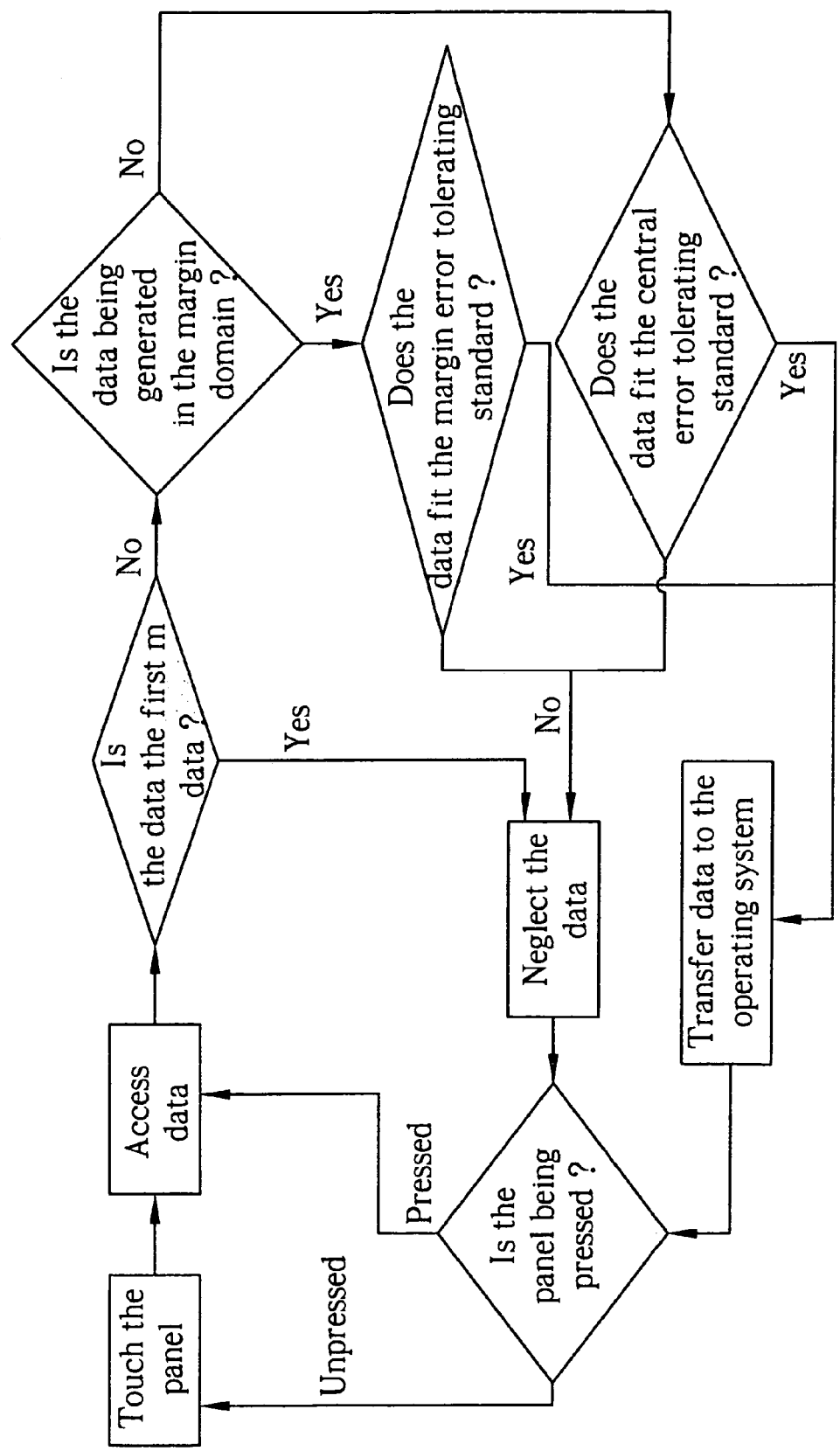
FIG. 7 is a flowchart of operations according to a second embodiment of the present invention touch pad illustrated in FIG. 4.

In the present invention, different error tolerating standards are further applied to determine signals generated in different positions on the panel 32 in order to solve problems of writing quality at the margin domain of the panel 32. Please refer to FIG. 7. Illustrated in FIG. 7 is a flowchart according to a second embodiment of the touch pad 30 illustrated in FIG. 4. Similar to the flowchart having a signal neglecting mechanism illustrated in FIG. 6, the flowchart illustrated in FIG. 7 further includes a new error determination mechanism. In the first place, the panel 32 illustrated in FIG. 4 will be divided to a margin domain 48 and a central domain 46. As the plurality of digital signals are successively inputted signals with close positions on the panel 32, after the processor 36 neglects a first m digital signals of the plurality of digital signals, the processor 36 will be utilized to determine whether the first m digital signals of the plurality of digital signals are generated on the margin domain 48 or on the central domain 46 of the panel 32. When the processor 36 determines that the plurality of digital signals are generated from the margin domain 48 on the panel 32, the processor 36 will then continue to determine whether the plurality of digital signals fit a predetermined margin error tolerating standard. If the plurality of digital signals fit the margin error tolerating standard, the processor 36 will then continue to output a first n digital signals of the processed plurality of digital signals to the operating system 38 for neglecting the last n digital signals before a pen, or similar touching object is removed. Similarly, when the processor 36 determines that the plurality of digital signals are generated from the central domain 46 on the panel 32, the processor 36 will then continue to determine whether the plurality of digital signals fit a predetermined central error tolerating standard. If the plurality of digital signals fit the central error tolerating standard, the processor 36 will then continue to process following steps, or the digital signals will be neglected.

Please note that the most significant difference between the flowcharts illustrated in FIG. 7 and in FIG. 6 is that signals generated from different areas on the panel 32 will be processed differently. Therefore, according to the structure and arrangement of the panel 32 illustrated in FIG. 4, the margin error tolerating standard is different to the central error tolerating standard wherein values of the tolerated error in the margin domain 48 is less than values of the tolerated error in the central domain 46. Thus, the margin error tolerating standard must be more strict than the central error tolerating standard. Furthermore, based on the idea that signals generated from different areas on the panel 32 will be modified by different error tolerating standards, the panel 32 can be divided into not just two domains such as the margin domain 48 and the central domain 46, but into a plurality of domains according to pressing sensitivity, wherein each domain is given a different error tolerating standard.

Figure 8:
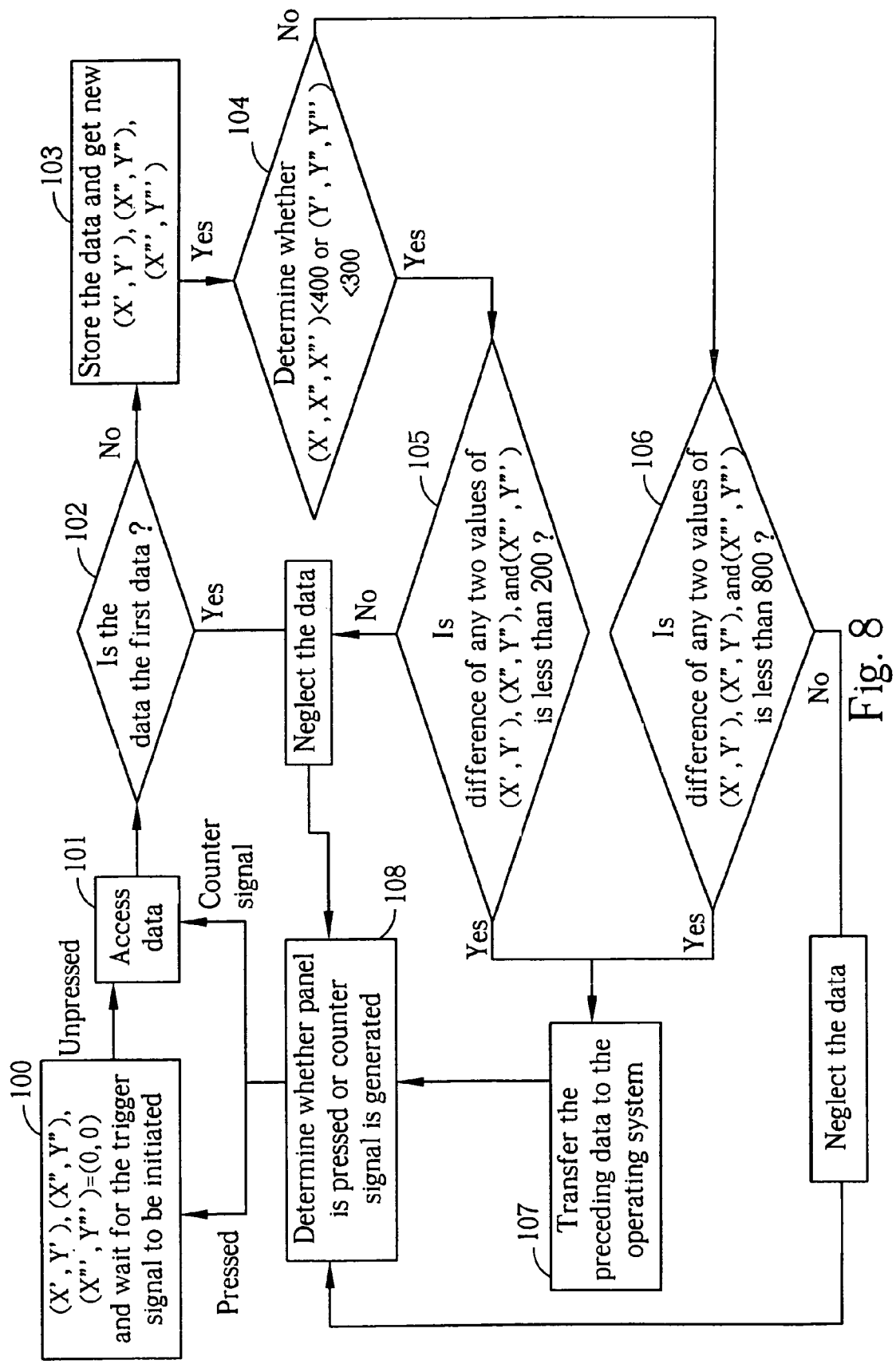
FIG. 8 is a flowchart of operations according to the flowchart illustrated in FIG. 7.

Please refer to FIG. 8. Illustrated in FIG. 8 is a flowchart according to a third embodiment of the touch pad 30 illustrated in FIG. 4. Similar to operations of the flowchart illustrated in FIG. 7, the touch pad 30 further comprises a memory for sequentially temporarily storing the plurality of digital signals, and a counter for the processor 36 to read and process during a fixed time span. In FIG. 8, a number of the plurality of digital signals being processed as a time is determined as three wherein m and n are 1, meaning that the first one signal after being pressed and the last one signal before removing the pen will be neglected. The flowchart of FIG. 8 is described as follows:

Step 100: Predetermine three digital signals with initial values as (X',Y'), (X'',Y''), (X''',Y''')=(0,0) respectively. Wait for the generation of the trigger signal IRQ. If the processor 36 is initiated by the trigger signal IRQ, perform step 101;

Step 101: Read a digital signal;

Step 102: Determine whether the read digital signal is the first digital signal after the panel is pressed; if so, neglect the digital signal; if not, perform step 103;

Step 103: Store the digital signal into the memory to generate a set with three digital signals for being processed later;

Step 104: Determine whether the three digital signals are generated from the margin domain 48; if so, perform step 106 (In the embodiment of the present invention, the analog-to-digital converter 40 is a 12-byte analog-to-digital converter so that the width of the X and Y dimensions of the panel 32 can be displayed as values from 0 to 4096. Therefore, in the embodiment, whether or not the three digital signals are generated from the margin domain 48 is determined by judging that any one of the values of the three digital signals is less than (400,300));

Step 105: Calculate a difference of any two digital signals of the three digital signals and determine whether or not the difference is less than a margin error tolerating value. As equation 1 and 2 show, the three digital signals are generated at a continuous handwriting process, so a difference between any two digital signals will be small. If the difference is larger than the margin error tolerating value, representing that the digital signals might be generated due to inadequate pressing pressures, do not perform step 107. If the difference fits the margin error tolerating value, then perform step 107. From the equation 1 and 2, the margin error tolerating value is 200;

$$|X'-X''|<200 |X''-X'''|<200 |X'-X'''|<200 \qquad \text{equation 1}$$

$$|Y'-Y''|<200 |Y''-Y'''|<200 |Y'-Y'''|<200 \qquad \text{equation 2}$$

Step 106: If the digital signals are generated from the central domain 46 of the panel 32, the processor 36 will be utilized to calculate a difference of any two digital signals of the three digital signals and determine whether the difference is less than a central error tolerating value. Due to lower required pressing pressures, the error tolerating value can be larger. From equation 3 and 4, the central error tolerating value is 800;

$$|X'-X'''|<800 |X''-X'''|<800 |X'-X''|<800 \quad \text{equation 3}$$

$$|Y'-Y'''|<800 |Y'-Y'''|<800 |Y''-Y'''|<800 \quad \text{equation 4}$$

Step 107: Report the digital signal sequentially before the accepted digital signal to the operating system 38 to neglect a digital signal with the possibility of having a wrong value while the pen or similar touching object is removed from the panel;

Step 108: If the pen is removed from the panel, the trigger signal IRQ will be terminated or transformed, and step 100 will be performed; if a counter signal is generated, then continue to read a next signal to the processor 36 and perform step 101.

Compared to the prior art, a delay buffer is applied in the present invention for buffering a trigger signal that initiates the processor to read data for avoiding pressing inaccuracies during handwriting processes. During operations of the system and data processing, the present invention neglects a first m digital signals after the panel is touched and a last n digital signals before a pen is removed from the panel, wherein m and n are integers with values equal to or larger than 1. Furthermore, the present invention utilizes different error tolerating standards to determine whether signals are correct to solve the writing quality problem in the margin domain. Thus, an existing hardware arrangement can be applied in the present invention combined with some modifications of software operations and hardware designs to completely avoid pressing inaccuracies in a touch pad.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for avoiding pressing inaccuracies in a touch pad,
   the touch pad comprising:
   a panel for generating a plurality of analog voltage signals;
   a control module, comprising an analog-to-digital converter for transforming the plurality of analog signals to a plurality of corresponding digital signals, electrically connected to the panel for monitoring the panel and receiving a plurality of analog voltage signals, (he control module further comprising a touch apparatus for generating a trigger signal and a delay buffer electrically connected between the touch apparatus and the processor for buffering the trigger signal; and
   a processor electrically connected to the control module for receiving and processing the plurality of digital signals to control operations of the touch pad;
   the method comprising:
   (a) sequentially receiving the plurality of analog signals generated by the panel when the panel is touched with the control module;
   (b) transforming the plurality of analog voltage signals to a plurality of corresponding digital signals and transmitting the plurality of digital signals to the processor with the analog-to-digital converter;
   (c) neglecting a first m digital signals of the plurality of digital signals wherein m is an integer with value equal to or larger than 1 with the processor to avoid pressing inaccuracies when touch of the panel is initiated;
   (d) neglecting a last n digital signals of the plurality of digital signals wherein n is an integer with value equal to or larger than 1 with the processor to avoid pressing inaccuracies when touch is removed from the panel;
   (j) in step (a), when the panel is touched, outputting the trigger signal with the touch apparatus to the processor for initiating the processor to sequentially read the plurality of digital signals; and
   (k) in step (j), before the trigger signal is transmitted to the processor, buffering the trigger signal with the delay buffer to avoid pressing inaccuracies of the touch pad.

2. The method of claim 1, wherein the panel comprises a margin domain and a central domain, the method further comprising: (e) after step (c), determining where the plurality of digital signals are generated in the margin domain or the central domain of the panel with the processor; (f) after step (e), when the processor determines that the plurality of digital signals are generated in the margin domain of the panel, determining whether the plurality of digital signals fits a predetermined margin error tolerating standard with the processor, and if so, performing step (d); and (g) after step (e), when the processor determines that the plurality of digital signals are generated in the central domain of the panel, determining whether the plurality of digital signals fits a predetermined central error tolerating standard with the processor, and if so, performing step (d).

3. The method of claim 2 further comprising: (h) in step (f), when the plurality of digital signals are generated in the margin domain, calculating a difference of any two signals of the plurality of digital signals and determining whether a value of the difference is less than a margin tolerating error value for determining whether the plurality of digital signals fits the margin error tolerating standard with the processor; and (i) in step (g), when the plurality of digital signals are generated in the central domain, calculating a difference of any two signals of the plurality of digital signals and determining whether a value of the difference is less than a central error tolerating value for determining whether the plurality of digital signals fits the central error tolerating standard with the processor.

4. The method of claim 3 wherein the central error tolerating value is larger than the margin error tolerating value.

5. The method of claim 1 wherein the delay buffer is an analog resistance-capacitance (R-C) or a digital delay circuit.

6. The method of claim 1 wherein the processor comprises an operating system for processing the plurality of digital signals, the method further comprising: (l) after step (c), outputting the plurality of digital signals with the processor to the operating system wherein the first m and the last n digital signals of the plurality of digital signals are neglected.

7. The method of claim 6 wherein the touch pad further comprises a memory for sequentially temporarily storing the plurality of digital signals, the method further comprising: (m) before step (l), sequentially storing the plurality of digital signals into the memory except for the first m digital signals; and (n) in step (m), outputting a first n digital signals of the digital signals being processed and stored in the memory with the processor to transmit the plurality of digital signals to the operating system, except for the last n digital signals.

8. The method of claim 1 wherein the touch pad is a resistive panel.

9. A method for avoiding pressing inaccuracies of a touch pad, wherein the touch pad comprises:
- a panel, comprising at least a margin domain and a central domain, the panel for generating a plurality of analog voltage signals; and
- a control module electrically connected to the panel for monitoring the panel and receiving the plurality of the analog voltage signals, the control module comprising;
- an analog-to-digital converter (ADC) for transforming the plurality of the analog voltage signals to a plurality of corresponding digital signals;
- a touch apparatus for generating a trigger signal; and
- a delay buffer electrically connected to the touch apparatus for buffering the trigger signal;
- a processor electrically connected to the control module for controlling operations of the touch pad; and an operating system for processing the plurality of the digital signals;

the method comprising;
- (a) determining whether the panel is being touched with the control module;
- (b) outputting the trigger signal with the touch apparatus to the processor to initiate the processor when the control module determines the panel has been touched;
- (c) in step (b), buffering the trigger signal with the delay buffer;
- (d) after step (a), sequentially generating the plurality of analog voltage signals with the panel;
- (e) after step (d), sequentially receiving the plurality of analog voltage signals with the control module, the analog-to-digital converter for transforming the plurality of analog voltage signals to the plurality of corresponding digital signals, and the control module for transmitting the plurality of digital signals to the processor;
- (f) neglecting a first re digital signals of the plurality of digital signals with the processor, wherein m is an integer with a value equal to or larger than 1 to avoid pressing inaccuracies when touch of the panel is initiated;
- (g) after step (f), determining whether the plurality of digital signals are generated in the margin domain or the central domain of the panel with the processor;
- (h) after step (g), when the plurality of digital signals are generated in the central domain of the panel, calculating a difference of values of any two signals of the plurality digital signals and determining whether the difference is less than a central error tolerating value with the processor;
- (i) after step (g), when the plurality of digital signals are generated in the margin domain of the panel, calculating a difference of values of any two signals of the plurality digital signals and determining whether the difference is less than a margin error tolerating value with the processor;
- (j) sequentially generating the plurality of digital signals to the operating system with the processor when a difference is less than the central or margin tolerating value; and
- (k) in step (j), neglecting a last n digital signals of the plurality of digital signals with the processor, wherein n is a integer with value equal to or larger than 1 to avoid pressing inaccuracies when touch is removed from the panel.

10. The method of claim 9 wherein the plurality of digital signals are output to the operating system except for the first m and the last n digital signals.

11. The method of claim 9 wherein the central error tolerating value is larger than the margin error tolerating value.

12. The method of claim 9 wherein the touch pad further comprises a memory for storing the plurality of digital signals, the method further comprising:
- (l) after step (f), sequentially storing the plurality of digital signals into the memory;
- (m) in step (j), outputting a first n digital signals of the digital signals being processed and stored in the memory to neglect the last n digital signals of the plurality of digital signals in step (k) with the processor.

13. A touch pad comprising:
- a panel for generating a plurality of analog voltage signals;
- a control module electrically connected to the panel for receiving the plurality of analog voltage signals, the control module comprising:
  - an analog-to-digital converter for transforming the plurality of analog voltage signals to a plurality of corresponding digital signals;
  - a touch apparatus for generating a trigger signal; and
  - a delay buffer electrically connected to the touch apparatus for buffering the trigger signal;
- a processor electrically connected to the control module for controlling operations of the touch pad; and
- an operating system for processing the plurality of digital signals;
- wherein when the control module determines that the panel is being touched, the panel will sequentially generate the plurality of analog voltage signals, the touch panel will output the trigger signal to the processor for initiating the processor, and before the processor receives the trigger signal, the delay buffer is capable of buffering the trigger signal for avoiding pressing inaccuracies of the touch pad; at the same time, the control module will sequentially receive the plurality of analog voltage signals, utilize the analog-to-digital converter to transform the plurality of analog voltage signals to the plurality of corresponding digital signals, and output the plurality of digital signals to the processor for sequentially outputting the plurality of digital signals to the operating system, the processor neglecting to output to the operating system a first m digital signals of the plurality of digital signals, wherein m is an integer with value equal to or larger than 1 to avoid pressing inaccuracies when touch of the panel is initiated;
- wherein the panel comprises a margin domain and a central domain, and before the operating system receives the plurality of digital signals, the processor will determine whether the plurality of digital signals are generated from the margin domain or the central domain of the panel;
- wherein before the processor determines whether the plurality of digital signals are generated from the margin domain or the central domain of the panel, the processor will neglect the first m digital signals of the plurality of digital signals for outputting the plurality of digital signals to the operating system without the first m digital signals of the plurality of digital signals, wherein m is an integer with value equal to or larger than 1.

14. The touch pad of claim 13 wherein when the processor determines that the plurality of digital signals are generated from the margin domain of the panel, the processor will calculate a difference of values of any two digital signals of the plurality of digital signals for determining whether the difference is less than a margin error tolerating value; and when the processor determines that the plurality of digital signals are generated from the central domain of the panel, the processor will calculate a difference of values of any two digital signals of the plurality of digital signals for determining whether the difference is less than a central error tolerating value.

15. The touch pad of claim 14 wherein the central error tolerating value is larger than the margin error tolerating value.

16. The touch pad of claim 14 wherein when the plurality of digital signals are generated from the margin domain of the panel and the difference of values of any two digital signals of the plurality of digital signals is less than the margin error tolerating value, or when the plurality of digital signals are generated from the central domain of the panel and difference of values of any two digital signals of the plurality of digital signals is less than the central error tolerating value, the processor will neglect a last n digital signals of the plurality of digital signals for outputting the plurality of digital signals to the operating system without the last n digital signals of the plurality of digital signals, wherein n is an integer with value equal to or larger than 1.

17. The touch pad of claim 16 further comprising a memory for temporarily storing the plurality of digital signals, wherein the processor will output a first n digital signals of the plurality of digital signals being processed and stored in the memory to the operating system for making the control module neglect the last n digital signals of the plurality of digital signals.

* * * * *